US012572949B2

(12) United States Patent
Rademacher

(10) Patent No.: US 12,572,949 B2
(45) Date of Patent: *Mar. 10, 2026

(54) METHODS AND SYSTEMS FOR DETERMINING THE AUTHENTICITY OF A COMPONENT USING ELLIPTIC-CURVE CRYPTOGRAPHY

(71) Applicant: LEXMARK INTERNATIONAL, INC., Lexington, KY (US)

(72) Inventor: Timothy John Rademacher, Richmond, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,177

(22) Filed: Sep. 9, 2024

(65) Prior Publication Data

US 2024/0428269 A1 Dec. 26, 2024

Related U.S. Application Data

(63) Continuation of application No. 17/498,433, filed on Oct. 11, 2021, now Pat. No. 12,086,814.

(51) Int. Cl.
*G06Q 30/018* (2023.01)
*G06F 7/58* (2006.01)
*H04L 9/30* (2006.01)

(52) U.S. Cl.
CPC ........... *G06Q 30/018* (2013.01); *G06F 7/588* (2013.01); *H04L 9/3066* (2013.01)

(58) Field of Classification Search
CPC ..... G06Q 30/018; G06F 7/588; H04L 9/3066; H04L 9/0662
See application file for complete search history.

(56) References Cited

U.S. PATENT DOCUMENTS 8,631,247 B2 * 1/2014 O'Loughlin ........ G06F 12/1408
726/28
2019/0052468 A1 * 2/2019 Ngoc-Ai Lu ........... H04L 9/008

OTHER PUBLICATIONS

An Efficient RFID Authentication Scheme Based on Elliptic Curve Cryptography for Internet of Things Mustapha Benssalah, Izza Sarah, Karim Drouiche (Year: 2020).*

* cited by examiner

*Primary Examiner* — Alexandru Cirnu

(57) ABSTRACT

A method of determining the authenticity of a replaceable toner cartridge in a printing device using an elliptic curve E defined over a finite field $F_q$, where q is an integer, the method comprising: the printing device generating a random integer j, where the random integer j is in the interval of one to the integer q; the printing device calculating a point T=j·S, where point S is a point on elliptic curve E($F_q$); the printing device calculating a binary value k which is equal to the binary random integer j with a bitmask m applied thereto; the printing device sending point T and binary value k to the replaceable toner cartridge; and the replaceable toner cartridge iteratively calculating point U=n·S for different values of integer n, where for each iterative calculation integer n takes different values.

20 Claims, 4 Drawing Sheets

300

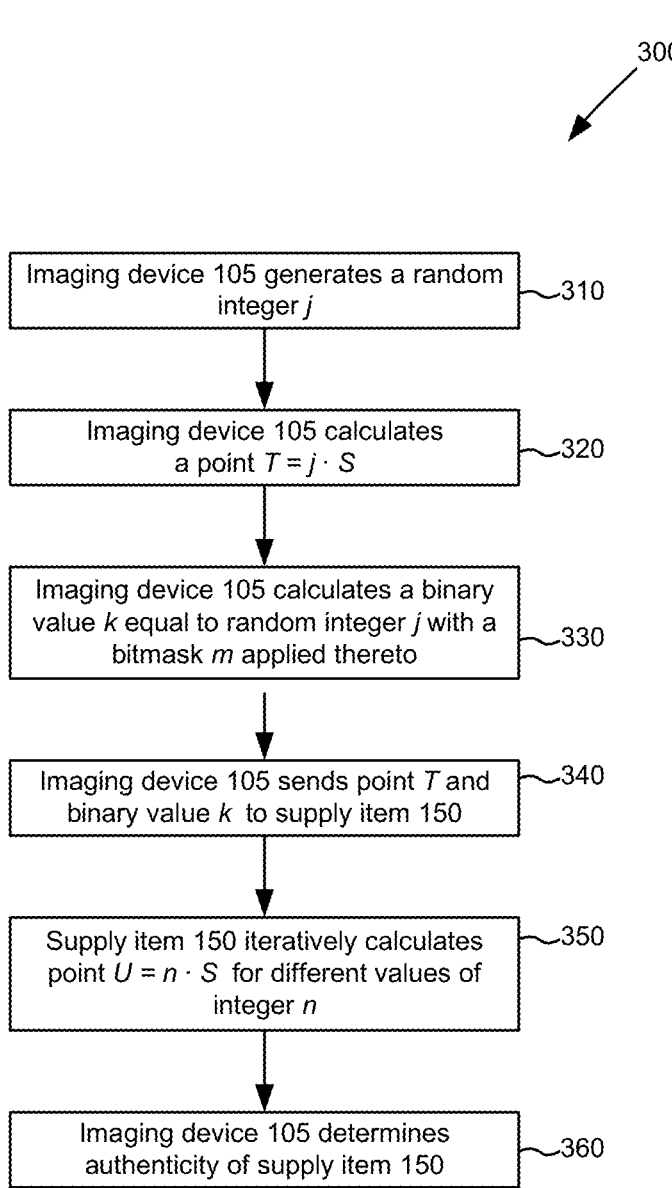

Imaging device 105 generates a random integer *j* ⌐310

Imaging device 105 calculates a point *T* = *j* · *S* ⌐320

Imaging device 105 calculates a binary value *k* equal to random integer *j* with a bitmask *m* applied thereto ⌐330

Imaging device 105 sends point *T* and binary value *k* to supply item 150 ⌐340

Supply item 150 iteratively calculates point *U* = *n* · *S* for different values of integer *n* ⌐350

Imaging device 105 determines authenticity of supply item 150 ⌐360

Fig. 3

METHODS AND SYSTEMS FOR DETERMINING THE AUTHENTICITY OF A COMPONENT USING ELLIPTIC-CURVE CRYPTOGRAPHY

CROSS REFERENCE TO RELATED APPLICATIONS

This application is a continuation of U.S. patent application Ser. No. 17/498,433 titled "Methods and Systems for Determining the Authenticity of a Component Using Elliptic-Curve Cryptography," filed on Oct. 11, 2021.

BACKGROUND

1. Technical Field

The present disclosure generally relates to methods and systems for determining the authenticity of a component, and, more particularly, methods and systems for determining the authenticity of a supply item component within an imaging device.

2. Description of the Related Art

In electronic systems, it is often desirable to confirm the authenticity of a component of the electronic system to ensure that the entire system operates as designed. Non-authentic components employ various techniques to mimic the behavior of authentic components. This may include copying the authentic component's circuits and memory contents in order to duplicate authentication algorithms or encrypted communication between the component and the rest of the electronic system. This is particularly important in printing systems where it is desirable to confirm the authenticity of a supply component of the printing system to ensure correct operation.

Non-authentic components may utilize different resources than an authentic component in order to accomplish similar behavior. For example, an encryption scheme done via a hardware circuit on the authentic component may be implemented on a non-authentic component via firmware running on a programmable microcontroller. This makes it easier to produce a non-authentic component which passes as an authentic component.

Moreover, in many cases a security component (for example in an imaging device) may be required to check the authenticity of several other components (for example a supply component) and may be required to carry out many other functions. Accordingly, the processing requirements for the security component may be high.

Additionally, as the lifecycle of imaging systems is typically much longer than the lifecycles of non-genuine supply items, the hardware (e.g. processors) in the non-genuine supply items may increase in power dramatically over the lifecycle of the imaging system which means that any security method may become obsolete over the course of its lifetime.

Accordingly, there is a need for improved systems and methods for determining the authenticity of a component to thwart the use of non-authentic components which can be improved over its lifetime in a flexible manner.

SUMMARY

The present disclosure provides example methods and systems that may be implemented in any general electronic system or specifically in an imaging/printing device/system to thwart the use of non-authentic components.

In an aspect, there is provided a method of determining the authenticity of a supply item in an imaging device using an elliptic curve E defined over a finite field $F_q$, where q is an integer, the method comprising: the imaging device generating a random integer j, where the random integer j is in the interval of one to the integer q; the imaging device calculating a point $T=j\cdot S$, where point S is a point on elliptic curve $E(F_q)$; the imaging device calculating a binary value k which is equal to the binary random integer j with a bitmask m applied thereto; the imaging device sending point T and binary value k to the supply item; and the supply item iteratively calculating point $U=n\cdot S$ for different values of integer n, where for each iterative calculation integer n takes different values, wherein for each iteration: the bits of binary integer n corresponding to the unmasked bits of bitmask m are the same as the corresponding bits of binary random integer j; and the bits of binary integer n corresponding to the masked bits of bitmask m are varied in each iteration.

With such a method, in certain implementations, there is provided an improved method for determining the authenticity of a component to thwart the use of non-authentic components which can be improved over its lifetime in a flexible manner. For example, over the lifetime of the imaging device, the bitmask m may be increased such that more bits are masked thereby increasing the complexity of the problem to be solved. This change can be done by over-the-air updates to the imaging device throughout its lifetime and increases the complexity in a convenient, gradual manner.

In certain implementations, the method further comprises: the imaging device requesting a response from the supply item; the supply item responding by returning at least part of the current value of the integer n to the imaging device; the imaging device comparing the at least part of the integer n received from the supply item with the corresponding part of random integer j.

In certain implementations, upon a determination that the at least part of the integer n received from the supply item is the same as the corresponding part of random integer j, the supply item is identified as an authentic component, and wherein upon a determination that the at least part of the integer n received from the supply item is different from the corresponding part of random integer j, the supply item is identified as a non-authentic component.

In certain implementations, the imaging device requests the response from the supply item after a predetermined time has elapsed.

In certain implementations, the iterative calculation by the supply item stops when $U=T$.

In certain implementations, the bits of binary value k corresponding to the unmasked bits of bitmask m are the same as the corresponding bits of binary random integer j, and wherein the bits of binary value k corresponding to the masked bits of bitmask m are masked bits.

In certain implementations, in the step of calculating the binary value k the bitmask m masks one or more of the least significant bits of the binary random integer j to give binary value k.

In certain implementations, in the step of calculating the binary value k the bitmask m masks sixteen of the least significant bits of the binary random integer j to give binary value k.

In certain implementations, iteratively calculating point U comprises adding point S to the point U of the previous iteration.

In certain implementations, bits in the bitmask m with a value of zero are masked bits of bitmask m and bits in the bitmask m with a value of one are unmasked bits of bitmask m, and wherein binary value k=binary random integer j AND bitmask m.

In certain implementations, for each iterative calculation performed by the supply item the binary integer n=binary value k OR binary value o, where binary value o AND bitmask m=0.

In certain implementations, bits in the bitmask m with a value of one are masked bits of bitmask m and bits in the bitmask m with a value of zero are unmasked bits of bitmask m, and wherein binary value k=binary random integer j OR bitmask m.

In certain implementations, for each iterative calculation performed by the supply item the binary integer n=binary value k AND binary value o, where binary value o OR bitmask m=1111 . . . 1.

In certain implementations, the method further comprises the imaging device saving at least part of random integer j to memory of the imaging device.

In certain implementations, the point S is saved in both the imaging device and the supply item.

In certain implementations the method comprises the imaging device sending the point S to the supply item.

In certain implementations, the bitmask m is saved in both the imaging device and
the supply item.

In certain implementations the method comprises the imaging device sending the bitmask m to the supply item.

In certain implementations, the elliptic curve E has a cofactor of one.

In certain implementations the point S is randomly selected.

In certain implementations, the imaging device increases the number of masked bits of bitmask m between subsequent determinations of the authenticity of a supply item. In certain implementations, the imaging device increases the number of masked bits of bitmask m between subsequent determinations of the authenticity of a supply item only after a predetermined amount of time has elapsed. In certain implementations, the predetermined amount of time is between 6 months and 5 years, optionally, between 1 year and 4 years, and further optionally between 2 years and 3 years.

In another aspect, there is provided an imaging system comprising: an imaging device; and a supply item communicatively connectable to the imaging device, wherein the imaging device is configured to determine the authenticity of the supply item using an elliptic curve E defined over a finite field $F_q$, where q is an integer, by: generating a random integer j, where the random integer j is in the interval of one to the integer q; calculating a point T=j·S, where point S is a point on elliptic curve $E(F_q)$; calculating a binary value k which is equal to the binary random integer j with a bitmask m applied thereto; and sending point T and binary value k to the supply item, and wherein the supply item is configured to: iteratively calculate point U=n. S for different values of integer n, where for each iterative calculation integer n takes different values, wherein for each iteration: the bits of binary integer n corresponding to the unmasked bits of bitmask m are the same as the corresponding bits of binary random integer j; and the bits of binary integer n corresponding to the masked bits of bitmask m are varied in each iteration.

In certain embodiments, the imaging device is configured to request a response from the supply item, wherein the supply item is configured to respond by returning at least part of the current value of the integer n to the imaging device, and wherein the imaging device is configured to compare the at least part of the integer n received from the supply item with the corresponding part of random integer j.

In certain embodiments, upon a determination that the at least part of the integer n received from the supply item is the same as the corresponding part of random integer j, the supply item is identified as an authentic component, and wherein upon a determination that the at least part of the integer n received from the supply item is different from the corresponding part of random integer j, the supply item is identified as a non-authentic component.

In certain embodiments, the imaging device is configured to request the response from the supply item after a predetermined time has elapsed.

In certain embodiments, the supply item is configured such that the iterative calculation by the supply item stops when U=T.

In certain embodiments, the bits of binary value k corresponding to the unmasked bits of bitmask m are the same as the corresponding bits of binary random integer j, and wherein the bits of binary value k corresponding to the masked bits of bitmask m are masked bits.

In certain embodiments, the point S is saved in both the imaging device and the supply item.

In certain embodiments the imaging device is configured to send the point S to the supply item.

In certain embodiments, the bitmask m is saved in both the imaging device and the supply item.

In certain embodiments, the imaging device is configured to send the bitmask m to the supply item.

In certain embodiments, the elliptic curve E has a cofactor of one.

In certain embodiments the point S is randomly selected.

In certain embodiments, the imaging device is configured to increase the number of masked bits of bitmask m between subsequent determinations of the authenticity of a supply item. In certain embodiments, the imaging device is configured to increase the number of masked bits of bitmask m between subsequent determinations of the authenticity of a supply item only after a predetermined amount of time has elapsed. In certain embodiments, the predetermined amount of time is between 6 months and 5 years, optionally, between 1 year and 4 years, and further optionally between 2 years and 3 years.

In any of the implementations/embodiments described herein, the components (e.g. the various leader/follower components) may be connected via any shared bus, such as I2C.

From the foregoing disclosure and the following detailed description of various examples, it will be apparent to those skilled in the art that the present disclosure provides a significant advance in the art of determining the authenticity of a component an electronic system. Additional features and advantages of various examples will be better understood in view of the detailed description provided below.

Throughout the disclosure, q is an integer. Throughout the disclosure, integer q may be either prime p for a prime field or integer $q=2^m$ for a binary (or characteristic two) field.

As used herein, the term 'leader' is equivalent to the term 'master' and can be used interchangeably throughout without changing the meaning. As used herein, the term 'follower' is equivalent to the term 'slave' and can be used interchangeably throughout without changing the meaning. Both terms 'master' and 'slave' take their usual meanings in the art, for example, as used in the official I2C specification.

BRIEF DESCRIPTION OF THE DRAWINGS

The above-mentioned and other features and advantages of the present disclosure, and the manner of attaining them, will become more apparent and will be better understood by reference to the following description of examples taken in conjunction with the accompanying drawings. Like reference numerals are used to indicate the same element throughout the specification.

FIG. 3 is a flow diagram illustrating a method associated with the imaging device of FIG. 1.

DETAILED DESCRIPTION OF THE DRAWINGS

Figure 1:
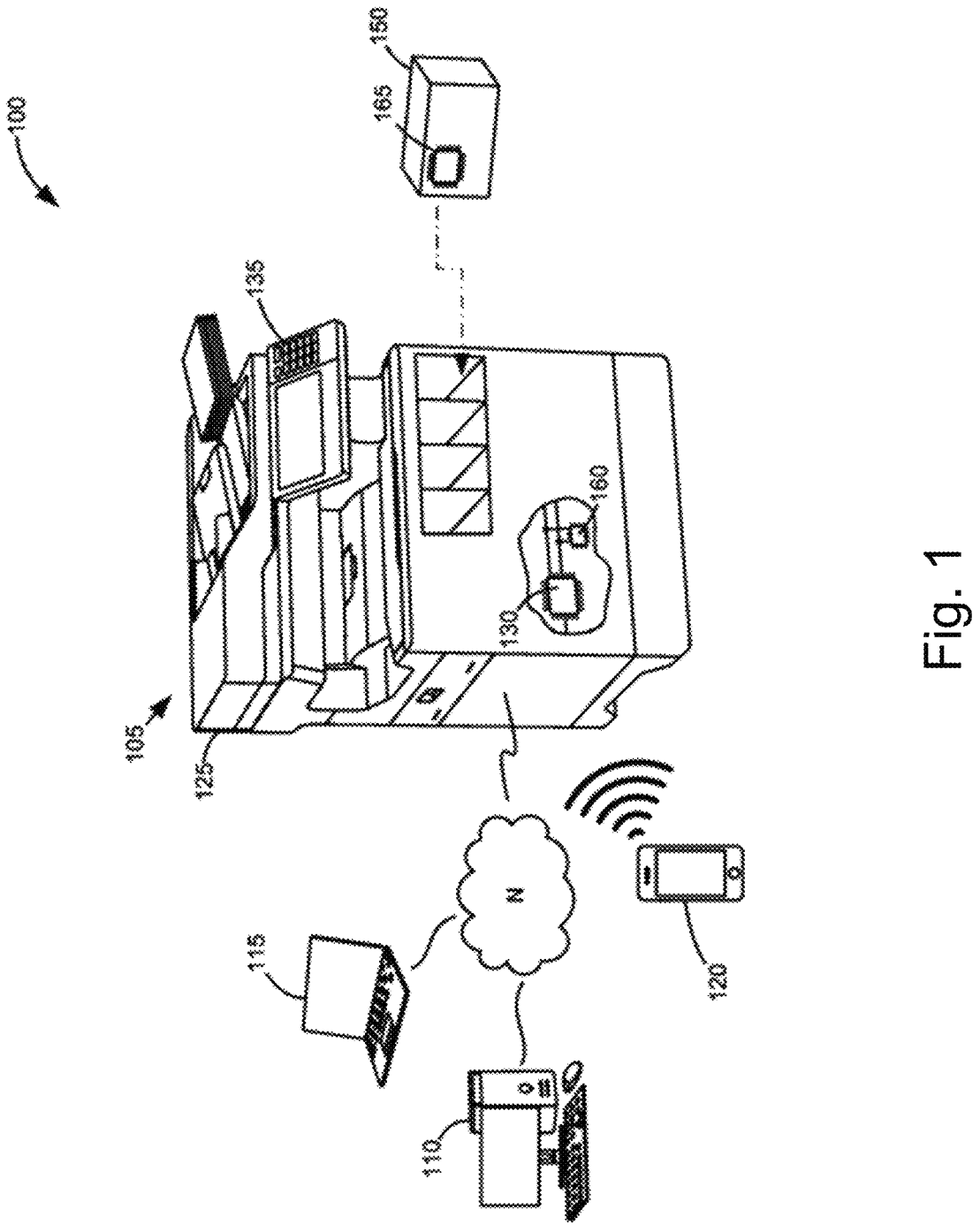
FIG. 1 is a diagrammatic view of an imaging system.

It is to be understood that the disclosure is not limited to the details of construction and the arrangement of components set forth in the following description or illustrated in the drawings. The disclosure is capable of other examples and of being practiced or of being carried out in various ways. For example, other examples may incorporate structural, chronological, process, and other changes. Examples merely typify possible variations. Individual components and functions are optional unless explicitly required, and the sequence of operations may vary. Portions and features of some examples may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that examples of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps or combinations of special purpose hardware and computer instructions.

Disclosed are example systems and methods for determining the authenticity of a component in an electronic system, such as an imaging/printer system.

Referring to FIG. 1, there is shown a diagrammatic view of an imaging system 100 used in association with the present disclosure. Imaging system 100 includes an imaging device 105 used for printing images on sheets of media. Image data of the image to be printed on a media sheet may be supplied to imaging device 105 from a variety of sources such as a computer 110, laptop 115, mobile device 120, scanner 125 of the imaging device 105, or like computing device. The sources directly or indirectly communicate with imaging device 105 via wired and/or wireless connections.

Imaging device 105 includes an imaging device leader component 130 and a user interface 135. Imaging device leader component 130 may include a processor and associated memory. In some examples, imaging device leader component 130 may be formed as one or more Application Specific Integrated Circuits (ASICs) or System-on-Chip (SoCs). Memory may be any memory device which stores data and may be used with or capable of communicating with processor. For example, memory may be any volatile or non-volatile memory or combination thereof such as, for example, random access memory (RAM), read-only memory (ROM), flash memory and/or non-volatile RAM (NVRAM) for storing data. Optionally, imaging device leader component 130 may control the processing of print data. Optionally, imaging device leader component 130 may also control the operation of a print engine during printing of an image onto a sheet of media.

In one example, imaging device 105 may employ an electronic authentication scheme to authenticate consumable supply items and/or replaceable units installed in imaging device 105. In FIG. 1, a representative consumable supply item/replaceable item, such as a toner cartridge 150, is shown (other consumable/replaceable supply items can equally be used in addition or instead, such as imaging units and fusers). Supply item 150 may be installed in a corresponding storage area in imaging device 105. To perform authentication of supply item 150, imaging device 105 may utilize an imaging device follower component 160 incorporated in imaging device 105 and a supply item follower component 165 of supply item 150.

Both imaging device follower component 160 in imaging device 105 and supply item follower component 165 in supply item 150 may be configured as follower devices that connect to imaging device leader component 130, the imaging device leader component 130 being configured to act as a leader device. Imaging device follower component 160 and supply item follower component 165 may operate in conjunction with imaging device leader component 130 to perform authentication functions, as will be explained in greater detail below.

Figure 2:
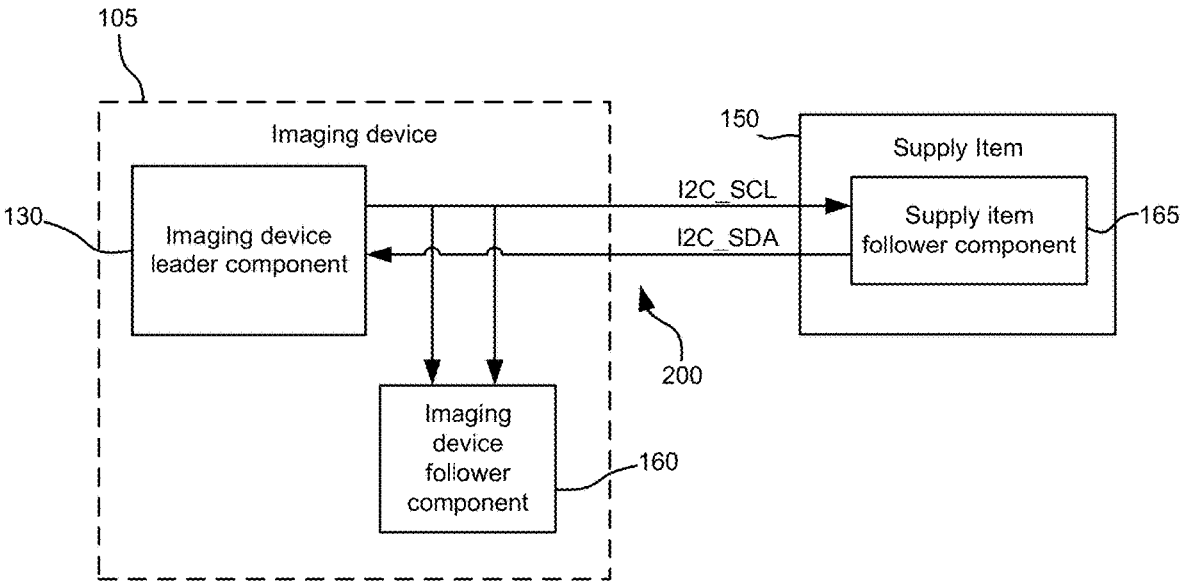
FIG. 2 is a block diagram depicting part of the imaging device of FIG. 1.

FIG. 2 is a block diagram depicting imaging device 105 and supply item 150. In this example, a shared bus system 200 may be employed to control various subassemblies and components (such as supply item 150) and/or obtain status reports thereof. The shared bus system 200 may be an Inter-Integrated Circuit (I2C) interface comprising a serial clock line (SCL) and serial data line (SDA). Various components such as an imaging unit, a toner cartridge 150, and other follower or supply devices and/or addressable components and subassemblies capable of receiving and/or handling data such as a fuser, a laser scan unit, and a media feed mechanism, may be connected to shared bus system 200 (for simplicity FIG. 2 only shows supply item 150 connected to the shared bus system 200). Imaging device leader component 130 may be generally configured to control a bus leader, which acts as the leader of the shared bus system 200. The bus leader may be implemented as firmware of the imaging device leader component 130.

Imaging device follower component 160 may operate in conjunction with bus leader to facilitate establishing connections between imaging device leader component 130 and various components and subassemblies (such as supply item 150) connected to shared bus system 200. For example, imaging device follower component 160 may be configured to provide authentication functions, safety and operational interlocks, and/or address change functions related to supply item 150 and other addressable components.

Reference is made to FIG. 3 which is a flow diagram illustrating an exemplary method 300 of determining the authenticity of a supply/replaceable item (such as supply item 150) in the imaging device 105. Even though the below method is described in relation to determining the authenticity of supply item 150, the method applies equally to determining the authenticity of any component in the system, such as any supply/replaceable item. Optionally, the exemplary method 300 may be implemented using the arrangement/configuration described in relation to FIG. 1 and/or FIG. 2.

The method 300 of determining the authenticity of supply item 150 uses an elliptic curve E defined over a finite field $F_q$, where q is an integer. Herein, the elliptic curve E defined over a finite field $F_q$ is referred to as elliptic curve $E(F_q)$.

When a determination of the authenticity of supply item 150 is required, in block 310, the imaging device 105 generates a random integer j, where random integer j is in the interval of one to the integer q (i.e. $0<j<q$). Random integer j may be generated in any way known to the skilled person, such as by a true (hardware) random number generator or a pseudo random number generator.

In block 320, the imaging device 105 calculates a point $T=j \cdot S$, where point S is a point on elliptic curve $E(F_q)$. Optionally, point S on elliptic curve $E(F_q)$ can be randomly selected. For example, point S on elliptic curve $E(F_q)$ can be randomly selected by multiplying the curve generator G of elliptic curve $E(F_q)$ by a random integer in the interval of one to the order of the curve q. Additionally/alternatively, the point S on elliptic curve $E(F_q)$ can be predetermined and stored within the imaging device 105.

In block 330, the imaging device 105 calculates a binary value k. The binary value k is equal to the binary random integer j with a bitmask m applied thereto. Bitmask m may be predetermined and known by imaging device 105 and supply item 150. Alternatively, bitmask m may be generated (e.g. randomly) by imaging device 105 and sent to supply item 150 (for example, together with point T and binary value k in block 340 described below).

Bitmask m is a binary value which is used to mask certain bits of binary random integer j. The bits of bitmask m which mask corresponding bits of binary random integer j are referred to as the masked bits of bitmask m, whereas the bits of bitmask m which do not mask (i.e. leave unchanged) corresponding bits of binary random integer j are referred to as the unmasked bits of bitmask m.

When the bitmask m is applied to binary random integer j the bits of binary random integer j which are masked are referred to as masked bits of binary random integer j, whereas the bits of binary random integer j which are not masked are referred to as unmasked bits of binary random integer j. By application of the bitmask m to binary random integer j, the masked bits of binary random integer j may be set to zero or one depending on the specific type of mask and the manner in which it is applied to binary random integer j. Application of the bitmask m to binary random integer j does not change the values of the unmasked bits of binary random integer j. This is detailed further below.

For example, the bitmask m when applied to binary random integer j may mask certain bits of binary random integer j to zero (herein described as masked OFF) and leaves the other bits of binary random integer j unchanged. In this case (masked OFF), the bits in the bitmask m with a value of zero are masked bits of bitmask m and bits in the bitmask m with a value of one are unmasked bits of bitmask m. For the masked OFF case, the binary random integer j with the bitmask m applied thereto (i.e. binary value k)=binary random integer j AND bitmask m. In other words, for the masked OFF case, binary value k=binary random integer j AND bitmask m.

Alternatively, the bitmask m when applied to binary random integer j may mask certain bits of binary random integer j to one (herein described as masked ON) and leaves the other bits of binary random integer j unchanged. In this case (masked ON), the bits in the bitmask m with a value of one are masked bits of bitmask m and bits in the bitmask m with a value of zero are unmasked bits of bitmask m. For the masked ON case, the binary random integer j with the bitmask m applied thereto (i.e. binary value k)=binary random integer j OR bitmask m. In other words, for the masked ON case, binary value k=binary random integer j OR bitmask m.

In block 340, the imaging device 105 sends point T and binary value k (and optionally bitmask m) to the supply item 150.

If the method is implemented using the configuration described in relation to FIG. 1 and/or FIG. 2, the imaging device 105 may send point T and binary value k (and optionally bitmask m) to the supply item 150 via the shared bus system 200 (e.g. an Inter-Integrated Circuit (I2C) interface).

In block 350, the supply item 150 iteratively calculates point U=n. S for different values of an integer n. As detailed below, for each iterative calculation of point U, the integer n takes a different value with respect to previous iterations.

Specifically, for each iterative calculation of point U=n. S, the supply item 150 varies integer n such that for each varied integer n in each iteration the following are both true: i) the bits of binary integer n corresponding to the unmasked bits of bitmask m are the same as the corresponding bits of binary random integer j; and ii) the bits of binary integer n corresponding to the masked bits of bitmask m are varied in each iteration. The bits of binary integer n corresponding to the masked bits of bitmask m may be varied in each iteration with respect to previous iterations such that no two iterations use the same value of binary integer n.

For example, in the masked OFF case, for each iterative calculation performed by the supply item 150, the binary integer n takes different values such that binary integer n=binary value k OR binary value o, where binary value o AND bitmask m=0, for different binary values o for each iteration. Therefore, for each iteration, supply item 150 varies a binary value o between iterations such that binary value o AND bitmask m=0 and calculates binary integer n=binary value k OR binary value o for use in that iteration. Once binary integer n is determined for that specific iteration, supply item 150 calculates point U=n·S.

Alternatively, in the masked ON case, for each iterative calculation performed by the supply item 150, the binary integer n takes different values such that binary integer n=binary value k AND binary value o, where binary value o OR bitmask m=1, for different binary values o for each iteration. Therefore, for each iteration, supply item 150 varies a binary value o between iterations such that binary value o OR bitmask m=1111 . . . 1 and calculates binary integer n=binary value k AND binary value o for use in that iteration. Once binary integer n is determined for that specific iteration, supply item 150 calculates point U=n·S.

For both the masked OFF case and the masked ON case, the binary value o varies for each iteration. For both cases, the binary value o may be varied systematically (which may be more efficient and predictable) or randomly. In the situation where the binary value o varies systematically, the masked bits may be incremented/decremented sequentially after each iteration.

Figure 4:
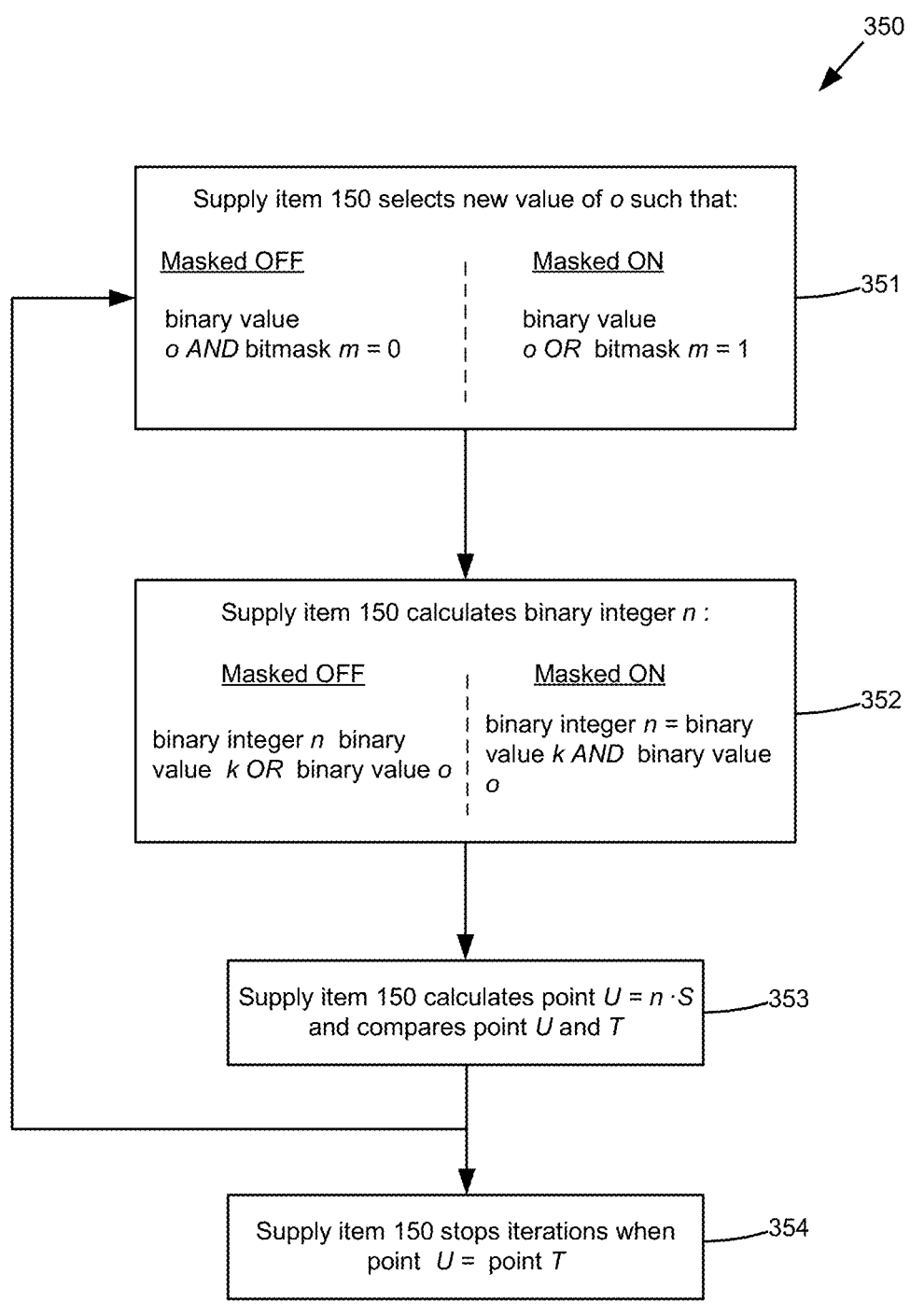
FIG. 4 is a flow diagram illustrating part of the method shown in FIG. 3.

FIG. 4 shows an exemplary method of performing the steps of block 350 for both the masked OFF and masked ON cases.

Once supply item 150 receives point T and binary value k (and optionally bitmask m) from imaging device 105 (see block 340), in block 351 the supply item 150 selects a starting value for binary value o for the first iteration of the calculation such that binary value o AND bitmask m=0 (for the masked OFF case) or binary value o OR bitmask m=1111 . . . 1 (for the masked ON case), as described above. With these constraints, the bits of binary value o which correspond to unmasked bits of bitmask m take the value of zero (for the masked OFF case) or one (for the masked ON case), whereas the bits of binary value o which correspond to masked bits of bitmask m can take any permutation/combination of zero/one values.

In block 352, supply item 150 calculates binary integer n=binary value k OR binary value o (for the masked OFF case) or binary integer n=binary value k AND binary value o (for the masked ON case), as described above. Therefore, for all iterations, the bits of binary integer n which correspond to unmasked bits of bitmask m take the values of the corresponding bits of binary random integer j, whereas the bits of binary integer n which correspond to masked bits of bitmask m are varied for each iteration such that (eventually) all possible permutations/combinations of these bit values are used.

In block 353, supply item calculates point U=n. S. The supply item 150 may compare the calculated value of point U with the point T sent by the imaging device 105 in block 340. If the calculated point U=point T then the method moves on to block 360. If the calculated point U does not equal point T then the method returns to block 351 to select a new value of binary value o for a new iteration.

For all iterations, binary value o AND bitmask m=0 (for the masked OFF case) or binary value o OR bitmask m=1 (for the masked ON case). As noted above, with these constraints, the bits of binary value o which correspond to unmasked bits of bitmask m take the value of zero (for the masked OFF case) or one (for the masked ON case), whereas the bits of binary value o which correspond to masked bits of bitmask m can take any permutation/combination of zero/one values. Accordingly, the various iterations can (eventually) use all possible permutations/combinations for the bits of binary value o which correspond to masked bits of bitmask m.

Returning to FIG. 3, in bock 360, the imaging device 105 determines the authenticity of the supply item 150. For example, in block 360, the imaging device 105 may request a response from the supply item. The imaging device 105 may request the response from the supply item 150 after a predetermined time has elapsed. For example, the imaging device 105 may request the response from the supply item 150 after a predetermined time has elapsed after the imaging device 105 sends point T and binary value k (and optionally bitmask m) to the supply item 150 (in block 340).

In response to the request, the supply item 150 may return at least part of the current value of the integer n to the imaging device 105. The returned at least part of integer n may include at least some of the masked bits of integer n. Optionally, the returned at least part of integer n may include all of the masked bits of integer n. Optionally, the returned at least part of integer n may include all of the bits of integer n (i.e. the supply item 150 may return all of the current value of the integer n to the imaging device 105).

Once the imaging device 105 receives the returned at least part of integer n, the imaging device compares the at least part of the integer n received from the supply item with the corresponding part of random integer j.

Upon a determination that the at least part of the integer n received from the supply item 150 is the same as the corresponding part of random integer j, the supply item 150 is identified as an authentic component.

Upon a determination that the at least part of the integer n received from the supply item 150 is different from the corresponding part of random integer j, the supply item 150 is identified as a non-authentic component. Optionally, upon identification that the supply item 150 is non-authentic, the imaging device 105 is configured to take an action, for example, to prevent further use of features of the imaging device 105 and/or display a notification that a verification error has occurred. Optionally, a user may be advised to acquire an authorized supply device 150 via a display of user interface or to contact a system administrator or technical support for assistance in addressing the issue.

In certain implementations, in block 330, in the step of calculating the binary value k the bitmask m masks one or more of the least significant bits of the binary random integer j to give binary value k. Optionally, the bitmask m masks sixteen of the least significant bits of the binary random integer j to give binary value k.

In such implementations, in block 350, iteratively calculating point U comprises adding point S to the point U of the previous iteration.

An example calculation is given below to further describe the method outlined in FIGS. 3 and 4. For this example, the elliptic curve E is selected as the NIST P-256 curve which is applicable to any of the methods described herein.

For NIST P-256, integer q is prime integer p=0xFFFFFFFF FFFFFFFF FFFFFFFF FFFFFFFF FFFFFFFF FFFFFFFF FFFFFFFE FFFFFC2F For NIST P-256, order=0xFFFFFFFFFFFFFFFFFFFFFFFF FFFFFFFEBAAEDCE6AF48A03BBFD25E8CD0364141

To determine a point S on the curve, a random integer r that is less than the order is selected. For NIST P-256, the order is close to $2^{256}$, so this may be done by simply generating a 256-bit random value using a cryptographic random number generator. If the value happens to be not less than the order (very low probability), then a new value may be generated until the random integer r that is less than the order is selected. In this example, random integer r is taken as 0x8B640DE0232E40CB896F287DA0BBE2028EA89 D60E1BD34E29B0BB740DF84661C Point S is determined by calculating S=r·G, where G is the NIST P-256 generator. In this example, point S=(0xAAAAC9B73050CB4C248D9FAD261522E1A6A6 F726DC85C20CE70388D6F1AEF8B3, 0xCD2B18F9D83A3487C603C2C4B23E64CA6385FC737 58E59A4B9459CDA6D813FC4)

In a preferred example which is applicable to all methods disclosed herein, bitmask m is selected as $$m = 0xFFFFFFFFFFFFFFFFFFFFFFFFFFFFFFFFFFFFFFF$$
$$FFFFFFFFFFFFFFFF0000$$

To authenticate a supply item 150, the imaging device 105 generates a random integer j. The same method used for generating random integer r may be used to generate random integer j. To protect the secret point, a lower limit may also be placed on random integer j, e.g. $2^{216}$. In this example, random integer j is taken as 0xBAC920DBFB0AEEFD67D0CF6AD0F6A31334324B8 1C4B9B75561C6E24BFBCBA447

Next, the imaging device 105 calculates point T=j·S. In this example, point T=(0xD3FDC6348E7744F AB03738A5F368F6BFF3A7607645EC7A5BC26CEFCEE C145A55, 0x1FC42AAE4D42668853FB5BAE954ACC2 F94C05FF5C855E571C70E84C89E0FFA21).

Herein, the x coordinate of point T is referred to as $T_x$ and the y coordinate of point T is referred to as $T_y$.

As bitmask m is selected as above, the imaging device 105 may save the least significant 16 bits of random integer j. Herein, the least significant 16 bits of random integer j is referred to as j' which, in this example, equals $$j' = 0xA447$$

Next, the imaging device 105 calculates binary value k is equal to the binary random integer j with a bitmask m applied thereto. As the bitmask m is selected as above, the imaging device 105 may calculate binary value k=j AND m. The imaging device 105 transmits to the supply item 150 $T_x$, $T_c=T_y$ mod 2 (point compression) and binary value k:

$$T_x = 0xD3FDC6348E7744FAB03738A5F$$
$$368F6BFF3A7607645EC7A5BC26CEFCEEC145A55$$
$$T_c = 1$$

k=0xBAC920DBFB0AEEFD67D0CF6AD0F6A31334324 B81C4B9B75561C6E24BFBCB0000

The supply item 150 then calculates point U=k·S. In this example, point U equals (0x39442EFE6BBB 179F1194AAA2D11917534F8E6C9CBDEFCECD658052 19E45C2CF3,0xD1B0B9DD21D43C64E8820A048 047311 7DEAA9974C3FE19A65D3DCCF05485E029).

The supply item 150 then executes the following pseudo-code:

$$answer = 0$$
$$while\ (Ux\ !\ = Tx)\ or\ (Uy mod2\ !\ = Tc):$$
$$U = U + S$$
$$answer = answer + 1$$
$$return\ answer$$

The supply item 150 loops until U=T. At that point, in this example, $$answer = 0xA447.$$

The supply item 150 transmits the answer to the imaging device 105 which compares this to j'. If these values match, then the supply item 150 is deemed as authentic by the imaging device 105.

In the above implementations/embodiments, the various components are configured as leader/follower components. This is purely optional and other communication busses may be used.

Relatively apparent advantages of the many embodiments include, but are not limited to, providing improved systems and methods for determining the authenticity of a component to thwart the use of non-authentic components which can be improved over its lifetime in a flexible manner.

It will be understood that the example applications described herein are illustrative and should not be considered limiting. It will be appreciated that the actions described and shown in the example flowcharts may be carried out or performed in any suitable order. It will also be appreciated that not all of the actions described in FIG. 3 need to be performed in accordance with the example embodiments of the disclosure and/or additional actions may be performed in accordance with other example embodiments of the disclosure.

For example, even though the above refers to follower/leader components, in alternative embodiments/implementations, other types of components may be used. Specifically, other types of communication busses may be used instead of an I2C bus.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of determining the authenticity of a replaceable toner cartridge in a printing device using an elliptic curve E defined over a finite field $F_q$, where q is an integer, the method comprising:

the printing device generating a random integer j, where the random integer j is in the interval of one to the integer q;

the printing device calculating a point T=j·S, where point S is a point on elliptic curve $E(F_q)$;

the printing device calculating a binary value k which is equal to the binary random integer j with a bitmask m applied thereto;

the printing device sending point T and binary value k to the replaceable toner cartridge; and the replaceable toner cartridge iteratively calculating point U=n·S for different values of integer n, where for each iterative calculation integer n takes different values, wherein for each iteration:

the bits of binary integer n corresponding to the unmasked bits of bitmask m are the same as the corresponding bits of binary random integer j; and the bits of binary integer n corresponding to the masked bits of bitmask m are varied in each iteration, and wherein the bits of binary value k corresponding to the unmasked bits of bitmask m are the same as the corresponding bits of binary random integer j, and wherein the bits of binary value k corresponding to the masked bits of bitmask m are masked bits.

2. The method of claim 1, further comprising:

the printing device requesting a response from the replaceable toner cartridge;

the replaceable toner cartridge responding by returning at least part of the current value of the integer n to the printing device;

the printing device comparing the at least part of the integer n received from the replaceable toner cartridge with the corresponding part of random integer j.

3. The method of claim 2, wherein upon a determination that the at least part of the integer n received from the replaceable toner cartridge is the same as the corresponding part of random integer j, the replaceable toner cartridge is identified as an authentic component, and wherein upon a determination that the at least part of the integer n received from the replaceable toner cartridge is different from the corresponding part of random integer j, the replaceable toner cartridge is identified as a non-authentic component.

4. A method of determining the authenticity of a supply item in a printing device using an elliptic curve E defined over a finite field $F_q$, where q is an integer, the method comprising:

the printing device generating a random integer j, where the random integer j is in the interval of one to the integer q;

the printing device calculating a point T=j·S, where point S is a point on elliptic curve $E(F_q)$;

the printing device calculating a binary value k which is equal to the binary random integer j with a bitmask m applied thereto;

the printing device sending point T and binary value k to the supply item; and the supply item iteratively calculating point U=n·S for different values of integer n, where for each iterative calculation integer n takes different values, wherein for each iteration:

the bits of binary integer n corresponding to the unmasked bits of bitmask m are the same as the corresponding bits of binary random integer j; and the bits of binary integer n corresponding to the masked bits of bitmask m are varied in each iteration.

5. The method of claim 4, further comprising:

the printing device requesting a response from the supply item;

the supply item responding by returning at least part of the current value of the integer n to the printing device;

the printing device comparing the at least part of the integer n received from the supply item with the corresponding part of random integer j.

6. The method of claim 5, wherein upon a determination that the at least part of the integer n received from the supply item is the same as the corresponding part of random integer j, the supply item is identified as an authentic component, and wherein upon a determination that the at least part of the integer n received from the supply item is different from the corresponding part of random integer j, the supply item is identified as a non-authentic component.

7. The method of claim 5, wherein the printing device requests the response from the supply item after a predetermined time has elapsed.

8. The method of claim 4, wherein the iterative calculation by the supply item stops when U=T.

9. The method of claim 4, wherein the bits of binary value k corresponding to the unmasked bits of bitmask m are the same as the corresponding bits of binary random integer j, and wherein the bits of binary value k corresponding to the masked bits of bitmask m are masked bits.

10. The method of claim 4, wherein in the step of calculating the binary value k the bitmask m masks one or more of the least significant bits of the binary random integer j to give binary value k.

11. The method of claim 10, wherein in the step of calculating the binary value k the bitmask m masks sixteen of the least significant bits of the binary random integer j to give binary value k.

12. The method of claim 10, wherein for iteratively calculating point U comprises adding point S to the point U of the previous iteration.

13. The method of claim 4, wherein bits in the bitmask m with a value of zero are masked bits of bitmask m and bits in the bitmask m with a value of one are unmasked bits of bitmask m, and wherein binary value k=binary random integer j AND bitmask m.

14. The method of claim 13, wherein for each iterative calculation performed by the supply item the binary integer n=binary value k OR binary value o, where binary value o AND bitmask m=0.

15. The method of claim 4, wherein bits in the bitmask m with a value of one are masked bits of bitmask m and bits in the bitmask m with a value of zero are unmasked bits of bitmask m, and wherein binary value k=binary random integer j OR bitmask m.

16. The method of claim 15, wherein for each iterative calculation performed by the supply item the binary integer n=binary value k AND binary value o, where binary value o OR bitmask m=binary 1111 . . . 1.

17. The method of claim 4, comprising the printing device saving at least part of random integer j to memory of the printing device.

18. A printing system comprising:

a printing device; and a supply item communicatively connectable to the printing device, wherein the printing device is configured to determine the authenticity of the supply item using an elliptic curve E defined over a finite field $F_q$, where q is an integer, by:

generating a random integer j, where the random integer j is in the interval of one to the integer q;

calculating a point T=j·S, where point S is a point on elliptic curve $E(F_q)$;

calculating a binary value k which is equal to the binary random integer j with a bitmask m applied thereto; and sending point T and binary value k to the supply item, and wherein the supply item is configured to:

iteratively calculate point U=n·S for different values of integer n, where for each iterative calculation integer n takes different values, wherein for each iteration:

the bits of binary integer n corresponding to the unmasked bits of bitmask m are the same as the corresponding bits of binary random integer j; and the bits of binary integer n corresponding to the masked bits of bitmask m are varied in each iteration.

19. The printing system of claim 18, wherein the printing device is configured to request a response from the supply item, wherein the supply item is configured to respond by returning at least part of the current value of the integer n to the printing device, and wherein the printing device is configured to compare the at least part of the integer n received from the supply item with the corresponding part of random integer j.

20. The printing system of claim 19, wherein upon a determination that the at least part of the integer n received from the supply item is the same as the corresponding part of random integer j, the supply item is identified as an authentic component, and wherein upon a determination that the at least part of the integer n received from the supply item is different from the corresponding part of random integer j, the supply item is identified as a non-authentic component.

\* \* \* \* \*